(12) United States Patent
Kim (10) Patent No.: US 11,987,129 B1
(45) Date of Patent: May 21, 2024

(54) POWER TRAIN OF AUTOMATIC TRANSMISSION

(71) Applicant: Hyundai Transys Inc., Seosan-si (KR)

(72) Inventor: Tae Hoon Kim, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 0 days.

(21) Appl. No.: 18/462,775

(22) Filed: Sep. 7, 2023

(51) Int. Cl.
   *B60K 6/54* (2007.10)
   *B60K 6/365* (2007.10)
   *B60K 6/48* (2007.10)

(52) U.S. Cl.
   CPC ............... *B60K 6/54* (2013.01); *B60K 6/365* (2013.01); *B60K 6/48* (2013.01); *B60K 2006/4825* (2013.01)

(58) Field of Classification Search
   CPC .... B60K 6/54; B60K 2006/541; B60K 6/365; B60K 6/48; B60K 2006/4825
   See application file for complete search history.

(56) References Cited

U.S. PATENT DOCUMENTS 10,591,049 B2 * 3/2020 Sasade .................... F16H 61/06
10,794,482 B2 * 10/2020 Hiasa ..................... B60K 6/543

FOREIGN PATENT DOCUMENTS

KR  10-2014-0120478 A     10/2014
KR     20140120478 A  * 10/2014

* cited by examiner

*Primary Examiner* — Derek D Knight
(74) *Attorney, Agent, or Firm* — Bridgeway IP Law Group, PLLC; Jihun Kim (57) ABSTRACT

In a power train of an automatic transmission, a first carrier is integrally configured with a single pinion that is engaged with a first sun gear and a first ring gear, a second carrier is integrally configured with a single pinion that is engaged with a second sun gear and a second ring gear, a third carrier is integrally configured with a single pinion that is engaged with a third sun gear and a third ring gear, and a fourth carrier is integrally configured with a single pinion that is engaged with a fourth sun gear and a fourth ring gear, and in which a reverse shift position is implemented by transmitting a reverse drive of a motor through an input shaft to the same power transmission path as a first shift position.

12 Claims, 6 Drawing Sheets

FIG. 1
(Prior Art)

|  | CL1 | CL2 | CL3 | B1 | B2 |
|---|---|---|---|---|---|
| 1st |  |  | ● | ● | ● |
| 2nd |  | ● |  | ● | ● |
| 3rd |  | ● | ● |  | ● |
| 4th | ● | ● |  |  | ● |
| 5th | ● |  | ● |  | ● |
| 6th | ● | ● | ● |  |  |
| 7th | ● |  | ● | ● |  |
| 8th | ● | ● |  | ● |  |
| Rev | ● |  |  | ● | ● |

FIG. 2

(Prior Art)

|  | CL1 | CL2 | CL3 | B1 | B2 | GEAR RATIO (EXAMPLE) |
|---|---|---|---|---|---|---|
| 1st |  |  | ● | ● | ● | 5.294 |
| 2nd |  | ● |  | ● | ● | 3.264 |
| 3rd |  | ● | ● |  | ● | 2.072 |
| 4th | ● | ● |  |  | ● | 1.675 |
| 5th | ● |  | ● |  | ● | 1.384 |
| 6th | ● | ● | ● |  |  | 1.000 |
| 7th | ● |  | ● | ● |  | 0.747 |
| 8th | ● | ● |  | ● |  | 0.617 |
| Rev (REVERSE DRIVE AT FIRST SHIFT POSITION) |  |  | ◉ | ◉ | ◉ | 5.294 |

POWER TRAIN OF AUTOMATIC TRANSMISSION

TECHNICAL FIELD

The present invention relates to a power train of an automatic transmission capable of implementing eight forward shift positions and a single reverse shift position.

BACKGROUND ART

In general, an automatic transmission is configured in various forms of structures to change power of an engine to match a driving load, and includes a gear train with planetary gears and a hydraulic control unit to operate the gear train. Since the gear train forms a shift position by the operation combination of friction elements such as a clutch or a brake operated by the hydraulic control unit, when the hydraulic control unit is automatically operated by a driving state of a vehicle and a driver's operation, a shift to the desired shift position is performed. The more multi-stage the shift positions of the automatic transmission has, the more efficiently it can transfer power from the engine to the drive wheels, which can improve fuel economy and acceleration performance, as well as shift quality.

Figure 1:
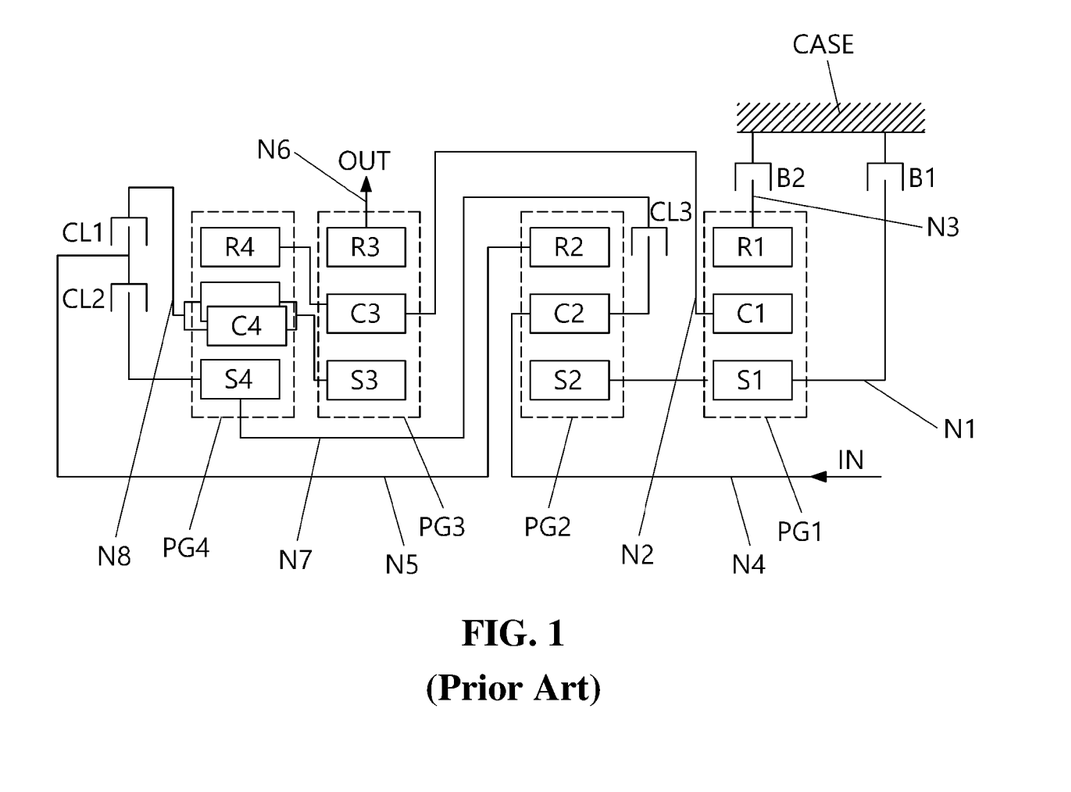
FIG. 1 is a view illustrating a power train of a conventional automatic transmission.
Figure 2:
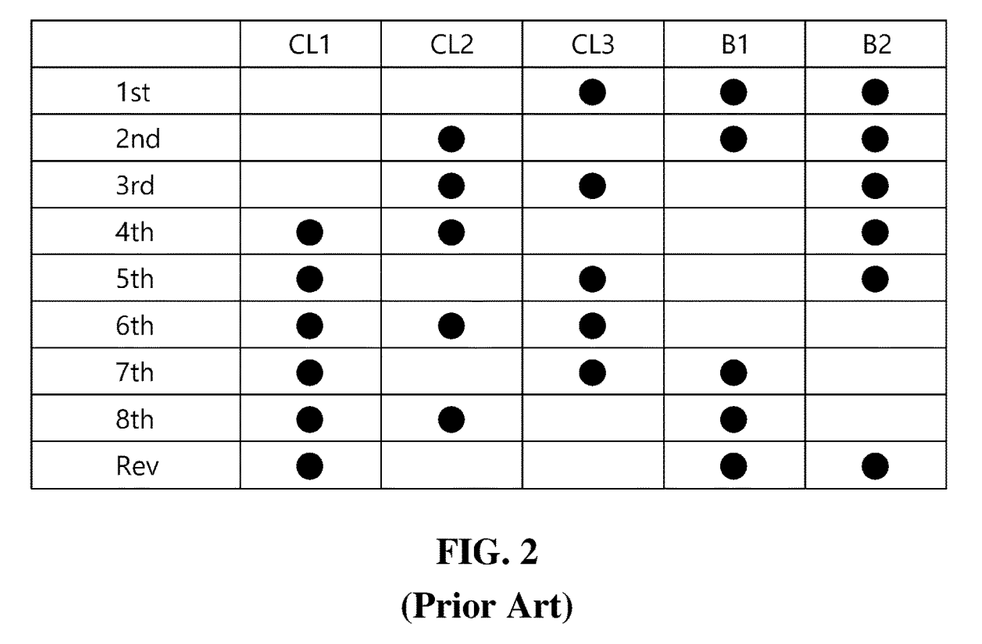
FIG. 2 is an operation table illustrating an operation for each shift position in the power train of the conventional automatic transmission.

FIG. 1 is a view illustrating a power train of a conventional automatic transmission, and FIG. 2 is an operational table illustrating an operation for each shift position of the power train of the conventional automatic transmission.

With reference to FIGS. 1 and 2, the power train of the conventional automatic transmission includes first, second, third, fourth, and fifth power transmission elements CL1, CL2, CL3, B1, and B2, a first planetary gear set PG1 including a first sun gear S1, a first carrier C1, and a first ring gear R1, a second planetary gear set PG2 including a second sun gear S2, a second carrier C2, and a second ring gear R2, a third planetary gear set PG3 including a third sun gear S3, a third carrier C3, and a third ring gear R3, and a fourth planetary gear set PG4 including a fourth sun gear S4, a fourth carrier C4, and a fourth ring gear R4.

The power train of a conventional automatic transmission includes a first rotating element N1 connecting the first sun gear S1 and the second sun gear S2, a second rotating element N2 connecting the first carrier C1, the third carrier C3, and the fourth ring gear R4, a third rotating element N3 connected to the first ring gear R1, a fourth rotating element N4 connecting the second carrier C2 and an input shaft IN, a fifth rotating element N5 connected to the second ring gear R2, a sixth rotating element N6 connecting the third ring gear R3 and an output shaft OUT, a seventh rotating element N7 connected to the fourth sun gear S4, and an eighth rotating element N8 connecting the third sun gear S3 to the fourth carrier C4.

However, the power train of the conventional automatic transmission has the fourth planetary gear set in a double-pinion structure, which was unfavorable for gear efficiency.

DOCUMENTS OF RELATED ART

Patent Documents (Patent Document 1) Korean Patent Application Laid-Open No. 10-2014-0120478 (published on Oct. 14, 2014)

SUMMARY OF THE INVENTION

To solve the above problems, the present invention is directed to providing a power train of an automatic transmission in which all of a plurality of planetary gear sets are configured in a single pinion structure, and a reverse drive of a motor is transmitted to the same power transmission path as a first shift position, so that a reverse shift position can be implemented.

To achieve the above-mentioned object, the present invention provides a power train of an automatic transmission, the power train includes: a first planetary gear set including a first sun gear selectively fixed to a case by a first brake, a first carrier, and a first ring gear selectively fixed to the case by a second brake; a second planetary gear set connected to the first planetary gear set and including a second sun gear connected to the first sun gear, a second carrier, and a second ring gear; a third planetary gear set connected to the second planetary gear set, including a third sun gear, a third carrier, and a third ring gear; and a fourth planetary gear set connected to the third planetary gear set and including a fourth sun gear, a fourth carrier, and a fourth ring gear, in which the first carrier is integrally configured with a single pinion that is engaged with the first sun gear and the first ring gear, in which the second carrier is integrally configured with a single pinion that is engaged with the second sun gear and the second ring gear, in which the third carrier is integrally configured with a single pinion that is engaged with the third sun gear and the third ring gear, in which the fourth carrier is integrally configured with a single pinion that is engaged with the fourth sun gear and the fourth ring gear, and in which a reverse shift position is implemented by transmitting a reverse drive of a motor through an input shaft to the same power transmission path as a first shift position.

At a reverse shift position, power generated by the reverse drive of the motor is transmitted to the input shaft, in which the power transmitted to the input shaft is transmitted to the third sun gear via the second carrier by an engagement operation of the third clutch, in which the power transmitted to the third sun gear is transmitted to the fourth sun gear via the third ring gear, and in which the power transmitted to the fourth sun gear is output to an output shaft via the fourth ring gear.

The fourth sun gear is connected to the third ring gear and is variably connected to the second ring gear by a first clutch.

The second ring gear is variably connected to the third sun gear by a second clutch.

The second carrier is connected to the input shaft and is variably connected to the third sun gear by a third clutch.

The first carrier is connected to the third carrier and the fourth carrier.

The fourth ring gear is connected to an output shaft.

The first clutch is engaged and operated at a fourth, a fifth, a sixth, a seventh, or an eighth shift position.

The second clutch is engaged and operated at a second, a third, the fourth, the sixth, or the eighth shift position.

The third clutch is engaged and operated at a first, the third, the fifth, the sixth, the seventh, or the reverse shift position.

The first brake is engaged and operated at the first, the second, the seventh, the eighth, or the reverse shift position.

The second brake is engaged and operated at the first, the second, the third, the fourth, the fifth, or the reverse shift position.

The motor is positioned between an engine and a transmission, and the power of the engine is variably connected to the input shaft by a fourth clutch.

The present invention is capable of implementing a reverse shift position (R shift position) by configuring all of a plurality of planetary gear sets as a single pinion structure, and transmitting a reverse drive of a motor to the same power transmission path as a first shift position.

The present invention can increase a gear ratio for the reverse shift position compared to the prior art.

The present invention can provide a transmission device for a vehicle optimized for a hybrid structure by implementing the reverse shift position through the reverse drive of the motor.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 3:
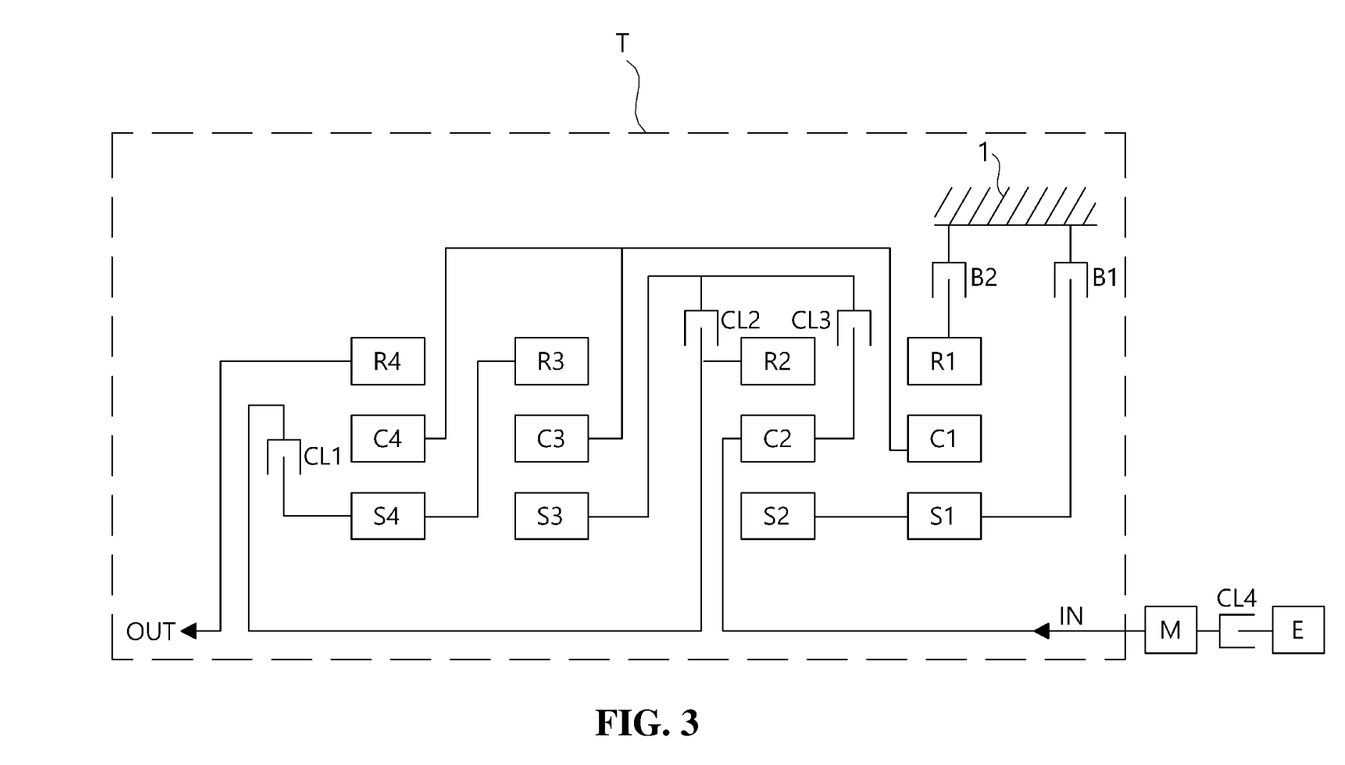
FIG. 3 is a view illustrating a power train of an automatic transmission according to a preferred embodiment of the present invention.
Figure 4:
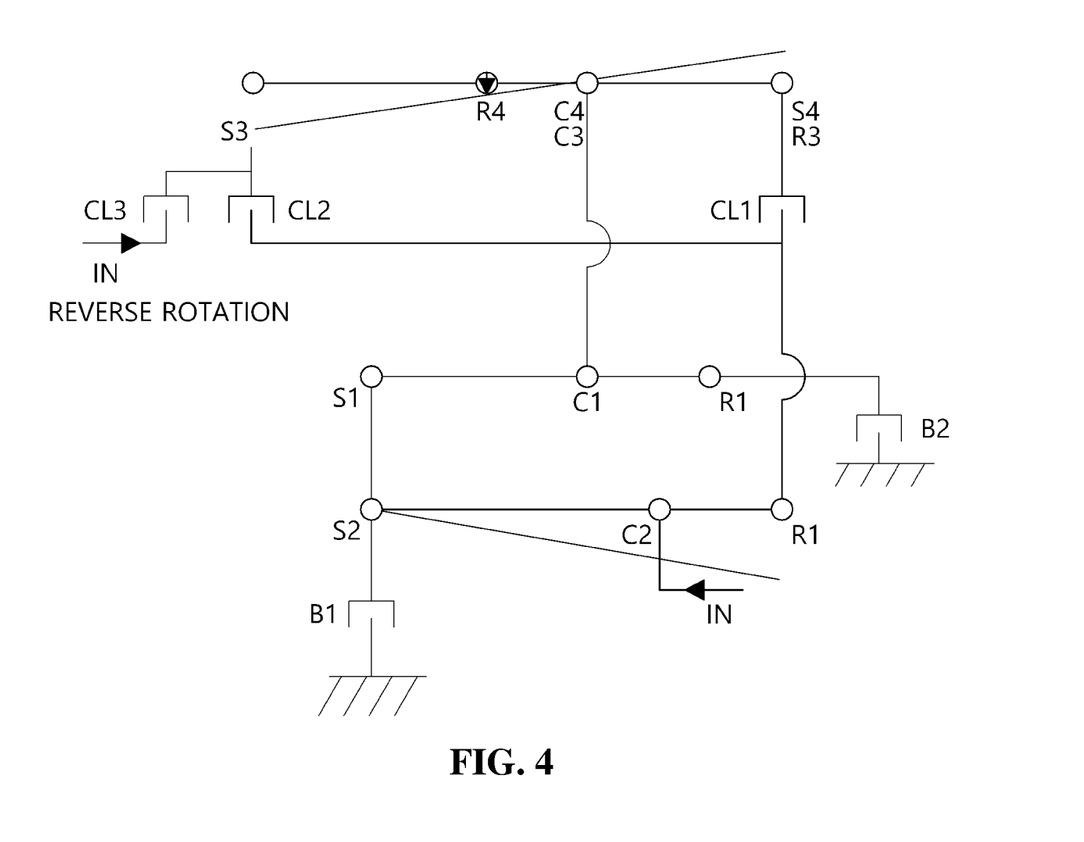
FIG. 4 is a view illustrating a velocity line plot at a reverse shift position according to a preferred embodiment of the present invention.
Figure 5:
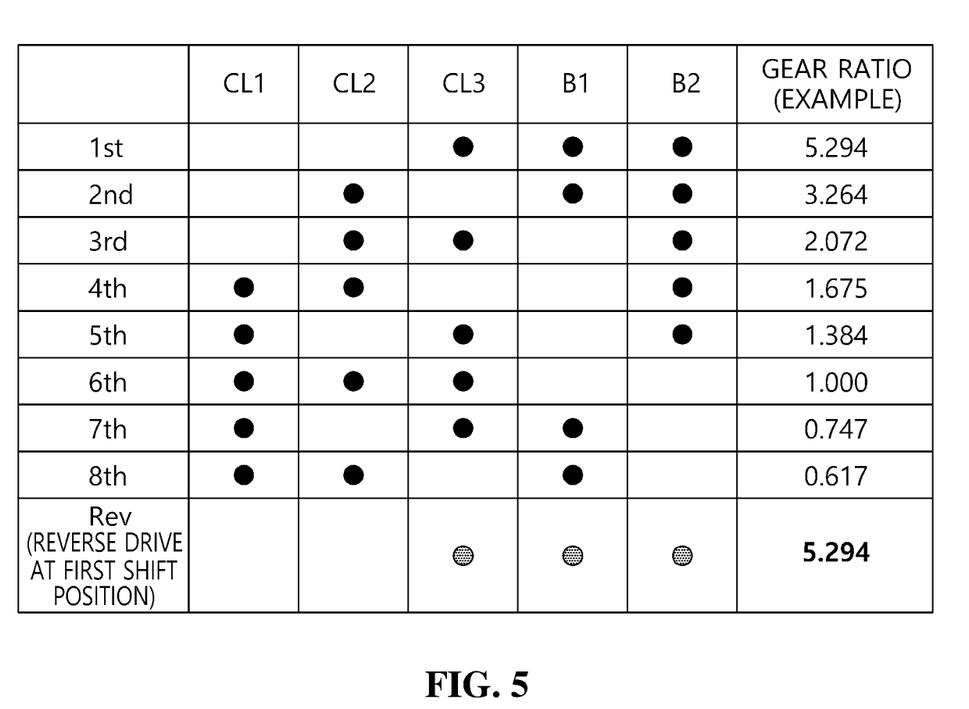
FIG. 5 is an operation table illustrating an operation for each shift position of the power train of the automatic transmission according to a preferred embodiment of the present invention.

FIG. 3 is a view illustrating a power train of an automatic transmission according to a preferred embodiment of the present invention, FIG. 4 is a view illustrating a velocity line plot at a reverse shift position according to a preferred embodiment of the present invention, and FIG. 5 is an operation table illustrating an operation for each shift position of the power train of the automatic transmission according to a preferred embodiment of the present invention.

As illustrated in FIGS. 3 to 5, the present invention includes a first planetary gear set, a second planetary gear set connected to the first planetary gear set, a third planetary gear set connected to the second planetary gear set, and a fourth planetary gear set connected to the third planetary gear set.

The first planetary gear set includes a first sun gear S1, a first carrier C1, and a first ring gear R1 that are connected to each other. The second planetary gear set includes a second sun gear S2, a second carrier C2, and a second ring gear R2 that are connected to each other. The third planetary gear set includes a third sun gear S3, a third carrier C3, and a third ring gear R3 that are connected to each other. The fourth planetary gear set includes a fourth sun gear S4, a fourth carrier C4, and a fourth ring gear R4 that are connected to each other.

The first sun gear S1 may be selectively fixed to a case 1 of a transmission T by a first brake B1. The first ring gear R1 may be selectively fixed to the case 1 of the transmission T by a second brake B2.

In the present invention, the first planetary gear set, the second planetary gear set, the third planetary gear set, and the fourth planetary gear set may be configured with a single pinion structure to improve gear efficiency.

Specifically, the first carrier C1 may be integrally configured with a single pinion (not illustrated). The single pinion is positioned between the first sun gear S1 and the first ring gear R1 and may be engaged with the first sun gear S1 and the first ring gear R1.

The second carrier C2 may be integrally configured with a single pinion (not illustrated). The single pinion is positioned between the second sun gear S2 and the second ring gear R2 and may be engaged with the second sun gear S2 and the second ring gear R2.

The third carrier C3 may be integrally configured with a single pinion (not illustrated). The single pinion is positioned between the third sun gear S3 and the third ring gear R3 and may be engaged with the third sun gear S3 and the third ring gear R3.

The fourth carrier C4 may be integrally configured with a single pinion (not illustrated). The single pinion is positioned between the fourth sun gear S4 and the fourth ring gear R4 and may be engaged with the fourth sun gear S4 and the fourth ring gear R4.

The conventional fourth planetary gear set is configured with a double pinion structure in which the fourth carrier is integrally configured with the double pinion, thereby resulting in unfavorable gear efficiency. However, in the present invention, the first planetary gear set, the second planetary gear set, the third planetary gear set, and the fourth planetary gear set are configured with a single pinion structure, which can improve gear efficiency compared to the conventional double pinion structure.

A reverse shift position (R shift position) may be implemented by transmitting a reverse drive of a motor M through an input shaft IN to the same power transmission path as a first shift position. The motor M may be positioned between an engine E and the transmission T. The power of the engine E may be connected to the input shaft IN when the fourth clutch CL4 is engaged and operated.

At the reverse shift position, the power generated by the reverse drive of the motor M may be transmitted to the input shaft IN. The power transmitted to the input shaft IN may be transmitted through the second carrier C2 to the third sun gear S3 by an engagement operation of a third clutch CL3. The power transmitted to the third sun gear S3 may be transmitted to the fourth sun gear S4 via the third ring gear R3. The power transmitted to the fourth sun gear S4 may be output to an output shaft OUT via the fourth ring gear R4.

The fourth sun gear S4 may be connected to the third ring gear R3 by a rotating element. The fourth sun gear S4 may be variably connected to the second ring gear R2 by a first clutch CL1.

The second ring gear R2 may be variably connected to the third sun gear S3 by a second clutch CL2.

The second carrier C2 may be connected to the input shaft IN by the rotating element. The second carrier C2 may be variably connected to the third sun gear S3 by the third clutch CL3.

The first carrier C1 may be connected to the third carrier C3 and the fourth carrier C4 by the rotating element.

The fourth ring gear R4 may be connected to the output shaft OUT by the rotating element.

The first clutch CL1 may be engaged and operated at a fourth, a fifth, a sixth, a seventh, or an eighth shift position. The second clutch CL2 may be engaged and operated at a second, a third, the fourth, the sixth, or the eighth shift position. The third clutch CL3 may be engaged and operated at a first, the third, the fifth, the sixth, the seventh, or the reverse shift position. The first brake B1 may be engaged and operated at the first, the second, the seventh, the eighth, or the reverse shift position. The second brake B2 may be engaged and operated at the first, the second, the third, the fourth, the fifth, or the reverse shift position.

Next, a flow of power at the reverse shift position according to the present invention is described.

Figure 6:
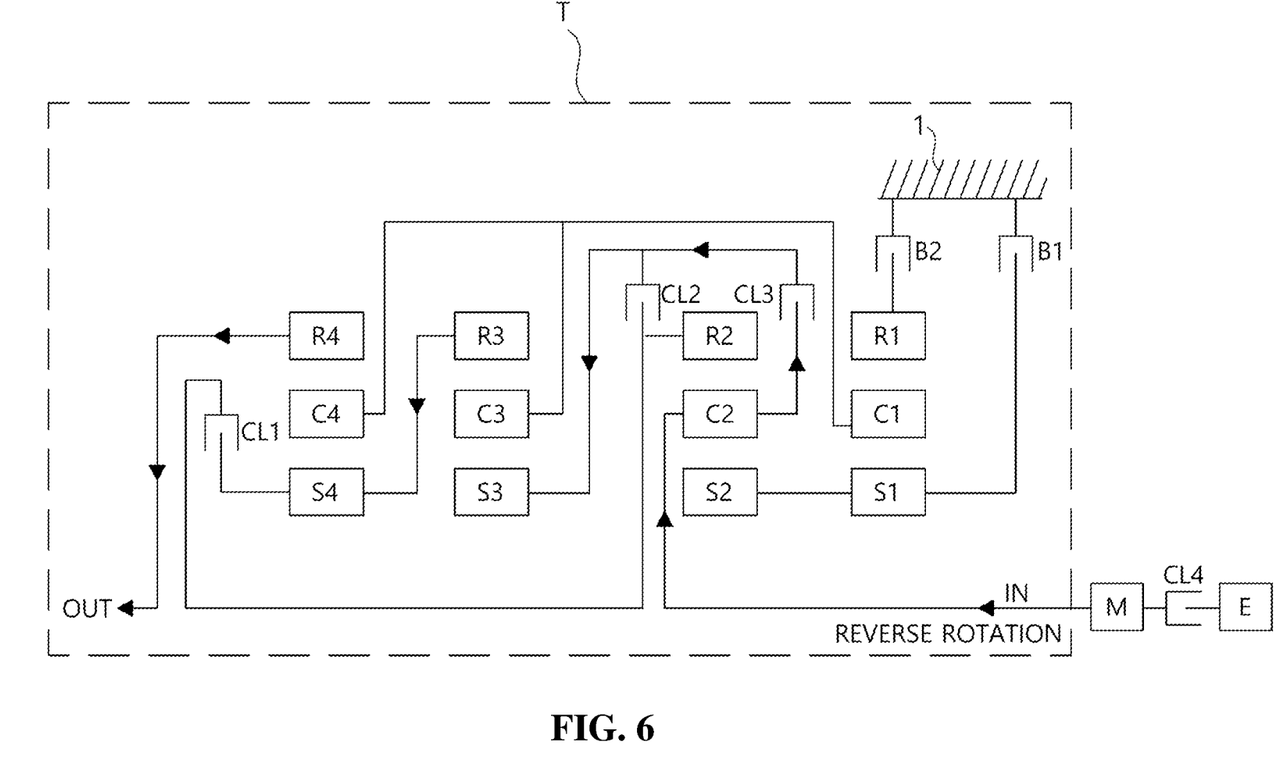
FIG. 6 is a view illustrating a flow of power at the reverse shift position of the power train of the automatic transmission according to a preferred embodiment of the present invention.

FIG. 6 is a view illustrating a flow of power at the reverse shift position of the power train of the automatic transmission according to a preferred embodiment of the present invention.

As illustrated in FIGS. 4 to 6, at the reverse shift position, the power generated by the reverse drive of the motor M is input to the input shaft IN. The power input to the input shaft IN is transferred to the second carrier C2.

The power transmitted to the second carrier C2 is transmitted to the third sun gear S3 by the engagement operation of the third clutch CL3. In this case, the first sun gear S1 may serve as a fixed element that is fixed to the case 1 by the engagement operation of the first brake B1, and the first ring gear R1 may serve as a fixed element that is fixed to the case 1 by the engagement operation of the second brake B2.

The power transmitted to the third sun gear S3 may be transmitted to the fourth sun gear S4 via the third ring gear R3. The power transmitted to the fourth sun gear S4 goes through the fourth ring gear R4, and a reverse rotation power is output to the output shaft OUT.

Meanwhile, at the first shift position, the power of the engine E is input to the input shaft IN. In this case, the engine E and the motor M are rotationally synchronized by the engagement operation of the fourth clutch CL4, so that the power of the engine E may be transmitted to the input shaft IN.

The power input to the input shaft IN is transferred to the second carrier C2. The power transmitted to the second carrier C2 is transmitted to the third sun gear S3 by the engagement operation of the third clutch CL3. In this case, the first sun gear S1 is fixed to the case 1 by the engagement operation of the first brake B1 and the first ring gear R1 is fixed to the case 1 by the engagement operation of the second brake B2.

The power transmitted to the third sun gear S3 may be transmitted to the fourth sun gear S4 via the third ring gear R3. The power transmitted to the fourth sun gear S4 may be output to an output shaft OUT via the fourth ring gear R4.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A power train of an automatic transmission, comprising:
    a first planetary gear set including a first sun gear selectively fixed to a case by a first brake, a first carrier, and a first ring gear selectively fixed to the case by a second brake;
    a second planetary gear set connected to the first planetary gear set and including a second sun gear connected to the first sun gear, a second carrier, and a second ring gear;
    a third planetary gear set connected to the second planetary gear set and including a third sun gear, a third carrier, and a third ring gear; and
    a fourth planetary gear set connected to the third planetary gear set and including a fourth sun gear, a fourth carrier, and a fourth ring gear,
    wherein the first carrier is integrally configured with a single pinion that is engaged with the first sun gear and the first ring gear, wherein the second carrier is integrally configured with a single pinion that is engaged with the second sun gear and the second ring gear, wherein the third carrier is integrally configured with a single pinion that is engaged with the third sun gear and the third ring gear, wherein the fourth carrier is integrally configured with a single pinion that is engaged with the fourth sun gear and the fourth ring gear, wherein the power train is configured to implement a reverse shift position by transmitting a reverse drive of a motor through an input shaft to a same power transmission path as a first shift position, wherein, at the reverse shift position, the power train is configured to transmit power generated by the reverse drive of the motor to the input shaft, transmit the power transmitted to the input shaft to the third sun gear via the second carrier by an engagement operation of a third clutch, transmit the power transmitted to the third sun gear to the fourth sun gear via the third ring gear, and output the power transmitted to the fourth sun gear to an output shaft via the fourth ring gear.

2. The power train of claim 1, wherein the fourth sun gear is connected to the third ring gear and is variably connected to the second ring gear by a first clutch.

3. The power train of claim 1, wherein the second ring gear is variably connected to the third sun gear by a second clutch.

4. The power train of claim 1, wherein the second carrier is connected to the input shaft and is variably connected to the third sun gear by a third clutch.

5. The power train of claim 1, wherein the first carrier is connected to the third carrier and the fourth carrier.

6. The power train of claim 1, wherein the fourth ring gear is connected to an output shaft.

7. The power train of claim 2, wherein the first clutch is configured to be engaged and operated at a fourth, a fifth, a sixth, a seventh, or an eighth shift position.

8. The power train of claim 3, wherein the second clutch is configured to be engaged and operated at a second, a third, a fourth, a sixth, or an eighth shift position.

9. The power train of claim 4, wherein the third clutch is configured to be engaged and operated at a first, a third, a fifth, a sixth, a seventh, or the reverse shift position.

10. The power train of claim 1, wherein the first brake is configured to be engaged and operated at a first, a second, a seventh, an eighth, or the reverse shift position.

11. The power train of claim 1, wherein the second brake is configured to be engaged and operated at a first, a second, a third, a fourth, a fifth, or the reverse shift position.

12. The power train of claim 1, wherein the motor is disposed between an engine and a transmission, and wherein the engine is variably connected to the input shaft by a fourth clutch.

* * * * *